Figure 1:
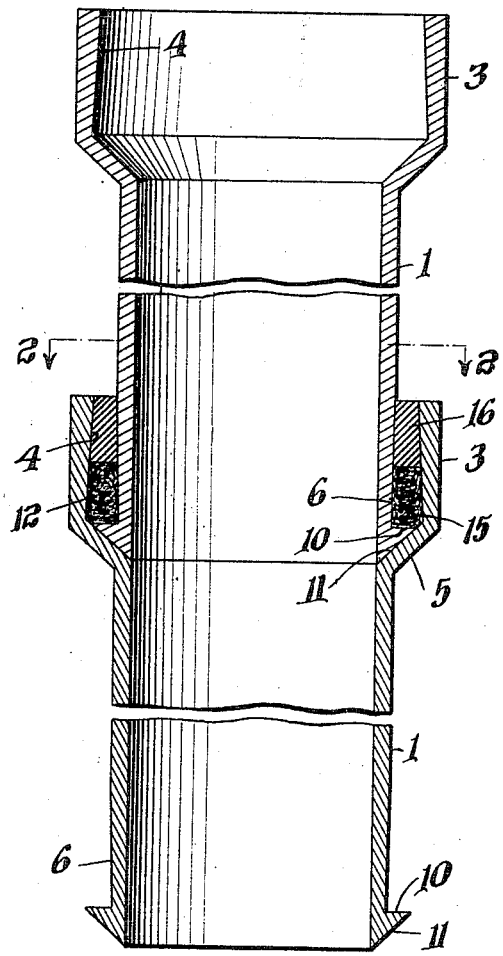

A. J. RUDOLPH.
PIPE AND PIPE JOINT.
APPLICATION FILED MAR. 9, 1916.

1,284,145.

Patented Nov. 5, 1918.

Witness
Daniel Webster Jr.

Inventor
Alfred J. Rudolph
By Cyrus N. Anderson
Attorney

UNITED STATES PATENT OFFICE.

ALFRED J. RUDOLPH, OF PHILADELPHIA, PENNSYLVANIA.

PIPE AND PIPE-JOINT.

1,284,145.  Specification of Letters Patent.  Patented Nov. 5, 1918.

Application filed March 9, 1916.  Serial No. 83,019.

*To all whom it may concern:*

Be it known that I, ALFRED J. RUDOLPH, a citizen of the United States, residing in the city of Philadelphia, county of Philadelphia, State of Pennsylvania, have invented certain new and useful Improvements in Pipes and Pipe-Joints, of which the following is a specification.

One object of my invention is to provide an improved construction of pipe joint in which the interlocking or telescoping end portions of the pipe sections are so constructed and related to each other that one pipe section automatically centers itself or registers with respect to the adjacent portion of the other pipe section when the small end of one pipe section is inserted into the enlarged end of another section; also so that the annular space intermediate the telescoping end portions are so shaped that the packing material therein is more firmly held and bound in case there should be a tendency of the pipes to separate from each other.

A further object of my invention is to provide a section of pipe having characteristics of construction which particularly adapt and fit it for the purpose stated in the last paragraph.

In the accompanying drawing forming a part of this specification I have illustrated one form of construction embodying my invention but it will be understood that changes in the details of construction may be made within the scope of the claims without departing from my said invention.

In the drawing:—

Figure 2:
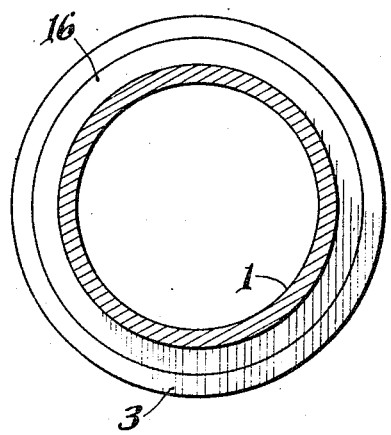

Figure 1 is a longitudinal sectional view showing pipe sections and a joint embodying my invention; and Fig. 2 is a transverse sectional view taken on the line 2—2 of Fig. 1.

Referring to the drawings, 1 designates pipe sections provided at one end with an enlarged portion 3 having a truncated cone-shaped interior due to the flaring of the inner surface thereof as indicated at 4 so that the internal diameter of the portion 3 is less at the end of the pipe than at a distance from such end. The external diameter of the portion 3 preferably is equal at all points as illustrated. The portion 3 is connected with the smaller main or body portion of the pipe section by means of an inwardly inclined inverted truncated cone-shaped portion 5. The internal diameter of the remaining portion of the pipe section preferably is equal at all points. The external diameter of the main or body portion of the pipe is decreased gradually as indicated at 6 for a short distance adjacent to the end of the section of pipe opposite the enlarged end. At its smaller end each pipe section is provided with an annular shoulder 10. The said end is also provided with an annular inwardly inclined surface 11 terminating at the outer edge of said shoulder, said surface 11 constituting an inverted truncated cone-shaped surface which is adapted to contact with the corresponding surface of the inverted truncated cone-shaped surface of the inwardly inclined annular portion 5. By reason of the engagement of these two surfaces when the smaller end of a pipe section is inserted into the enlarged end of another pipe section, as shown in Fig. 1 of the drawing, the said pipe sections are caused to automatically center themselves with respect to each other; that is to say, the said pipe sections are automatically brought into exact alinement and registration. When the two pipe sections are in telescopic relation with respect to each other, as shown in Fig. 1 of the drawing, an annular truncated cone-shaped space 12 is provided between the inner surface of the enlarged portion 3 and the outer surface of the opposed end portion of pipe which extends into said enlarged portion, said truncated cone-shaped space extending upwardly from the shoulder 10. After the sections of pipe have been positioned with relation to each other, as shown in Fig. 1 of the drawing, the packing and connecting material 15 which is placed in the bottom of the said annular space 12 and is packed and calked tightly up against the shoulder 10 as well as the sides of said chamber. After this has been done the lead packing 16 is poured into the annular space above the oakum or similar filling 15. The lead is also packed firmly and tightly downwardly into the said space. In view of the shape of the annular chamber 12 in which there is a gradual increase in the transverse width of the same from the top edge to the bottom thereof it is apparent that any force tending to separate the pipe sections has the effect of rendering the said packing and filling material tighter so as to prevent the possibility of leakage.

I claim:—

1. A pipe section having one end enlarged, the interior surface of said enlarged portion being of truncated cone-shape and the said pipe also having an annular inverted truncated cone-shaped portion connecting the said enlarged end portion of the pipe with the main body portion thereof and the opposite end portion of the said pipe having a part adjacent to its end reduced in external diameter and also having an annular shoulder adjacent to its end and the said end terminating with an enlargement having an inverted cone-shaped surface, substantially as and for the purpose stated.

2. In a pipe joint, in combination, a pipe section having an enlarged end portion, said enlarged end portion being connected with the main body portion of said section by an annular inverted truncated cone-shaped portion and the interior surface of the said enlarged portion being of truncated cone-shape, a second pipe section having its smaller end portion situated in the said enlarged end portion of the first-named pipe section, the external diameter of the portion of pipe within the said enlarged portion gradually decreasing toward the end of said pipe and terminating in an enlarged end portion having an inverted cone-shaped surface in contact with the inverted cone-shaped surface of the inverted cone-shaped portion above mentioned, and the said pipe also having a shoulder adjacent to said end, the external diameter of the portion of pipe within said enlarged end portion being substantially less than the internal diameter of the said enlarged portion whereby an annular chamber is formed, and packing material within the said annular chamber, substantially as and for the purpose described.

In testimony that I claim the foregoing as my invention, I have hereunto signed my name this 6th day of March, A. D. 1916.

ALFRED J. RUDOLPH.

Copies of this patent may be obtained for five cents each, by addressing the "Commissioner of Patents, Washington, D. C."